United States Patent
Hu et al.

(10) Patent No.: US 11,435,078 B2
(45) Date of Patent: Sep. 6, 2022

(54) STAND-OFF DEVICE FOR DOUBLE-SKIN COMBUSTOR LINER

(71) Applicant: PRATT & WHITNEY CANADA CORP., Longueuil (CA)

(72) Inventors: Tin-Cheung John Hu, Markham (CA); Oleg Morenko, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 418 days.

(21) Appl. No.: 16/448,584

(22) Filed: Jun. 21, 2019

(65) Prior Publication Data
US 2020/0200387 A1    Jun. 25, 2020

Related U.S. Application Data

(60) Provisional application No. 62/782,669, filed on Dec. 20, 2018.

(51) Int. Cl.
| | |
|---|---|
| F23R 3/00 | (2006.01) |
| F23R 3/60 | (2006.01) |
| F23R 3/48 | (2006.01) |
| F02C 3/14 | (2006.01) |
| F02K 1/80 | (2006.01) |

(52) U.S. Cl.
CPC .............. *F23R 3/002* (2013.01); *F23R 3/007* (2013.01); *F23R 3/60* (2013.01); *F02C 3/145* (2013.01); *F02K 1/80* (2013.01); *F05D 2260/38* (2013.01); *F05D 2300/6033* (2013.01); *F23R 3/48* (2013.01); *F23R 2900/00017* (2013.01); *F23R 2900/00018* (2013.01)

(58) Field of Classification Search
CPC .... F23R 3/002; F23R 3/48; F23R 3/60; F23R 2900/00018; F23R 3/007; F23R 2900/00017; F02C 3/145; F05D 2300/6033; F05D 2260/38; F02K 1/80; F02K 1/822; F16B 5/065
USPC ........................................................... 60/766
See application file for complete search history.

(56) References Cited

U.S. PATENT DOCUMENTS

| | | | |
|---|---|---|---|
| 4,748,806 A * | 6/1988 | Drobny .................. | F02K 1/822 |
| | | | 60/800 |
| 7,546,743 B2 | 6/2009 | Bulman et al. | |
| 9,423,130 B2 | 8/2016 | Prociw et al. | |
| 2003/0145604 A1* | 8/2003 | Pidcock .................... | F23R 3/60 |
| | | | 60/796 |
| 2012/0328996 A1* | 12/2012 | Shi .......................... | F23R 3/007 |
| | | | 431/253 |
| 2013/0154169 A1* | 6/2013 | Myers ................... | F01D 25/164 |
| | | | 267/103 |
| 2016/0356223 A1* | 12/2016 | Huang ..................... | F23R 3/60 |

\* cited by examiner

*Primary Examiner* — Gerald L Sung
*Assistant Examiner* — Rene D Ford
(74) *Attorney, Agent, or Firm* — Norton Rose Fulbright Canada LLP

(57) ABSTRACT

A combustor for a gas turbine engine comprises a combustor chamber defined at least partially by an outer combustor skin and an inner combustor skin. A plurality of stand-off devices have a body including a first end and a second end, the second end of the body retained in an opening in the outer combustor skin, the first end spaced apart from the second end and abutting the inner combustor skin to space the inner combustor skin apart from the outer combustor skin.

20 Claims, 2 Drawing Sheets

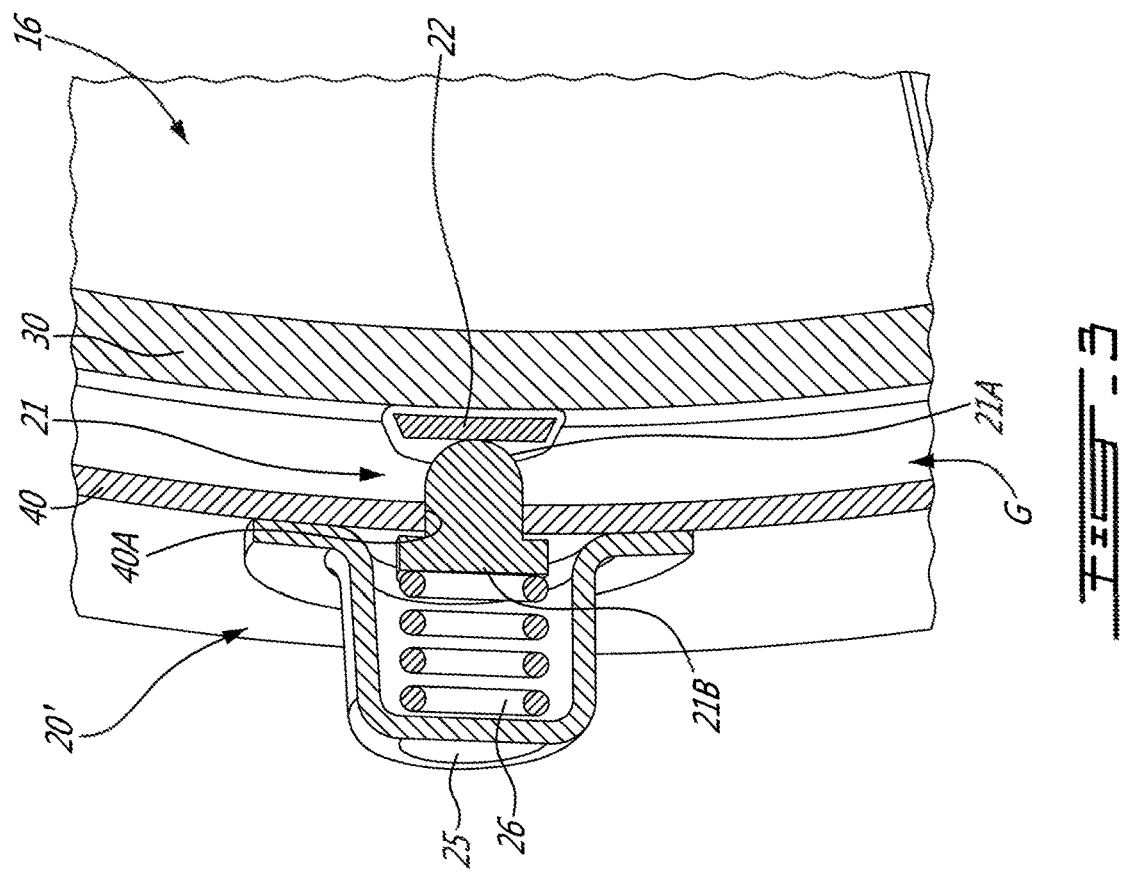
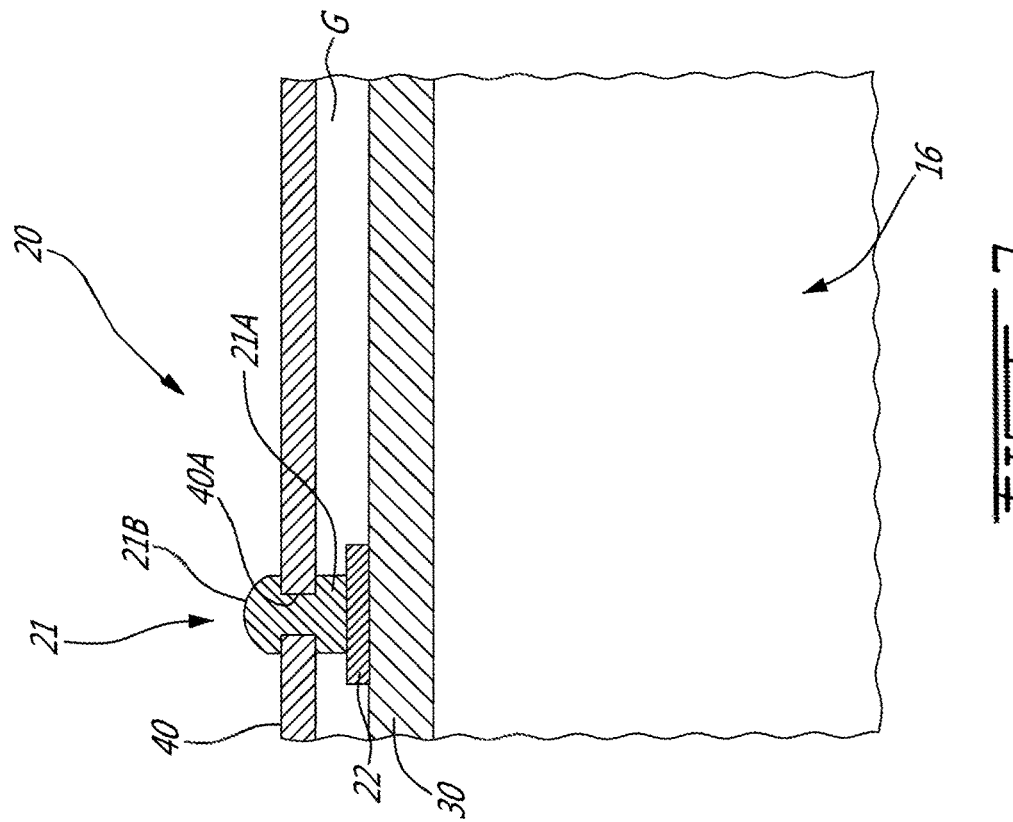

STAND-OFF DEVICE FOR DOUBLE-SKIN COMBUSTOR LINER

CROSS-REFERENCE TO RELATED APPLICATIONS

The present application claims priority on U.S. Provisional application No. 62/782,669 filed on Dec. 20, 2018, the content of which is incorporated herein by reference.

TECHNICAL FIELD

The application relates to gas turbine engines and more particularly to combustor liners with ceramic matrix composite panels.

BACKGROUND

Ceramic matrix composite (CMC) parts are used in a combustor for their capacity to sustain the high temperatures of combustion. The CMC parts may be part of a liner, with metal and CMC components. Full annular CMC combustor rings or circumferentially and axially segmented CMC panels are used in the hot side of a combustor to improve combustor durability. With double-skin combustor construction, backside impingement cooling and/or hot-side effusion film cooling schemes may be employed. Accordingly, the air gap between the metallic outer shell and the annular CMC combustor ring or the CMC combustor panels must be maintained, in spite of the different coefficients of thermal expansion involved.

SUMMARY

In one aspect, there is provided a combustor for a gas turbine engine comprising: a combustor chamber defined at least partially by an outer combustor skin and an inner combustor skin; and a plurality of stand-off devices, the stand-off devices having a body including a first end and a second end, the second end of the body retained in an opening in the outer combustor skin, the first end spaced apart from the second end and abutting the inner combustor skin to space the inner combustor skin apart from the outer combustor skin.

In another aspect, there is provided a stand-off device for double-skin combustor liner, the stand-off device comprising a body having a first end and a second end, the body configured to be retained by an outer combustor skin and to pass through an opening in the outer combustor skin for the first end to hold the inner combustor skin spaced apart from the outer combustor skin, the second end of the body accessible from an outer surface of the outer combustor skin.

DESCRIPTION OF THE DRAWINGS

Reference is now made to the accompanying figures in which:

FIG. 2 is a schematic sectional view of a stand-off device in the double-skin combustor of FIG. 1, in accordance with a first embodiment; and FIG. 3 is a perspective view of the interface of a stand-off device in the double-skin combustor of FIG. 1, in accordance with a second embodiment.

DETAILED DESCRIPTION

Figure 1:
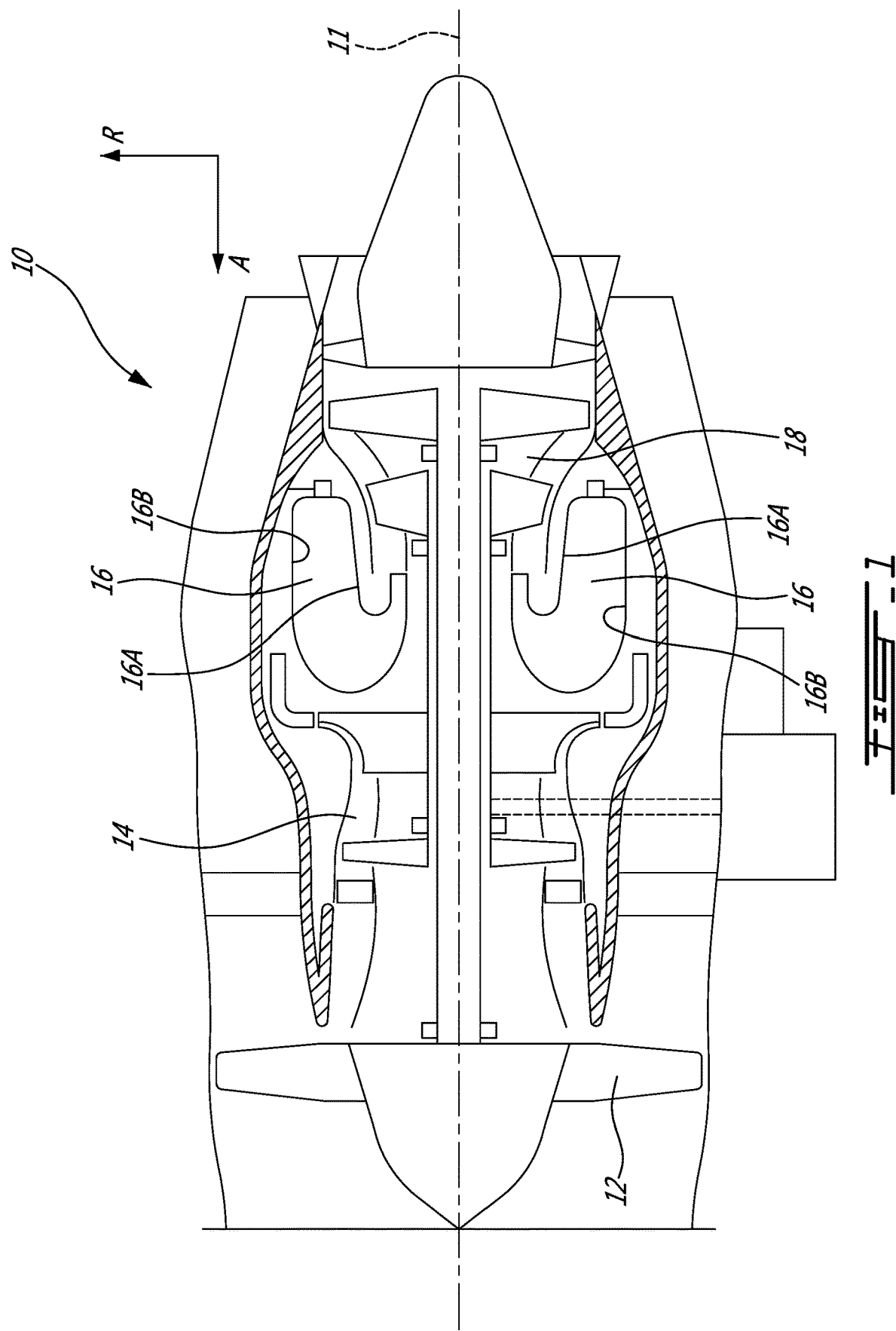
FIG. 1 is a schematic cross-sectional view of a gas turbine engine with a double-skin combustor in accordance with the present disclosure.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Though the combustor 16 is illustrated as a reverse-flow type combustor, other combustor configurations are contemplated, such as annular straight-through and can-type combustors. Components of the engine 10 are rotatable about a longitudinal center axis 11 of the engine 10.

The combustor 16 may have a double-skin construction as detailed hereinafter. The combustor 16 is annular in shape, around center axis 11. This explains the mirror images of the combustor 16 in FIG. 1, relative to the center axis 11. The combustor 16 may have an annular combustor chamber defined between an inner liner 16A and an outer liner 16B. Either one or both of the inner liner 16A and outer liner 16B may have double-skin constructions on part or all of the combustor 16.

Referring to FIG. 2, a stand-off device for maintaining a spacing in a double-skin combustor liner is generally shown at 20. The stand-off device 20 may be used in the gas turbine engine 10 of FIG. 1, with one or both of the inner liner 16A and outer liner 16B. For instance, a plurality of the stand-off device 20 may be present. The stand-off device 20 may be tasked with holding the skins 30 and 40 (a.k.a., combustor skins) spaced apart from one another for backside impingement and/or front-side effusion cooling, while allowing the thermal expansion of the skins 30 and 40 relative to one another.

A plurality of the stand-off devices 20 are used to hold the inner skin 30 and the outer skin 40 spaced apart from one another, such that the annular space G is defined between the skins 30 and 40. The skins 30 and 40 may be part of the inner liner 16A or of the outer liner 16B. The inner skins 30 are the ones that delimit an interior of the combustor 16. The inner skins 30 may be known as being the hot-side panel and are thus exposed to the combustion gases and temperatures. The inner skins 30 may be made of a ceramic matrix composite (CMC), or of other materials. The CMC used is one in which fibers (e.g., ceramic fibers, silicon carbide, alumina, carbon, carbon fibers, etc) are embedded in a ceramic matrix. For example, the inner skins 30 may be made of tiles of CMC panels. As another possibility, the inner skins 30 are made of single annular body of CMC, i.e. over 360 degrees. The stand-off devices 20 may be used with both configurations of the inner skin 30.

The outer skin(s) 40 define(s) an exterior of the combustor 16. The outer skins 40 may be known as the shell, metallic outer skin or metal shell of the combustor 16. The outer skins 40 form the structure of the combustor 16, in that they will support the inner skins 30. The outer skins 40 are made of metal, such as interconnected metallic segments or single annular metallic bodies. Although not shown, connectors, beams, or like structural components may be provided on the outer skin 40 for its connection to a structure of the gas turbine engine 10. Though only partially shown, some cooling holes may be defined in one or both of the skins 30 and 40, for cooling purposes.

Referring to FIG. 2, the stand-off device 20 has a body 21. The body 21 has a first end 21A and a second end 21B. The body 21 may be made of ceramic matrix composite (CMC), or metal, etc. In an embodiment, the body 21 is a monoblock component. The length of the body 21 is such that the inner skin 30 is held spaced apart from the outer skin 40, such that the gap G is maintained between the skins 30 and 40. The first end 21A is in contact with the radially outer surface of the inner skin 30. The first end 21A is free to slide along the outer surface of the inner skin 30, i.e., it is not attached to the inner skin 30. The first end 21A simply abuts against the inner skin 30. The first end 21A may have different geometries, including generally flat, spherical, or annular, etc, to press against the inner skin 30. The body 21 is retained by the outer skin 40, and passes through an opening 40A in the outer skin 40 for the first end 21A to hold the inner skin 30 spaced apart from the outer skin 40. As observed from FIG. 2, the second end 21B of the body 21 is accessible from an outer surface of the outer combustor skin 40, i.e., the surface facing away from the combustor chamber inward of the inner skin 30.

In FIG. 2, the second end 21B has a head portion. The first end 21A is also enlarged. By this arrangement, the stand-off device 20 is fixed at a discrete location on the combustor. This arrangement may be achieved by using a rivet or pin as the stand-off device 20. In such an arrangement, the stand-off device 20 may be installed from the exterior of the combustor 16, i.e., with a rivet tool or like instrument accessing the stand-off device 20 from a point of view looking at the outer surface of the outer skin 40. This installation may require that the openings 40A already be present in the outer skin 40 and/or that the openings be machined before the installation of the stand-off devices 20.

Still referring to FIG. 2, a coating 22, for instance in the form of a build-up layer of silicon or like coating, may optionally be used at the interface between the first end 21A and the cold side of the inner skin 30. The coating 22 may be made of a low friction material. As the relative rates of thermal expansion may be different between the inner skin 30 and the outer skin 40, the first end 21A may move along a plane of the inner skin 30, whereby the coating 22 may prevent or reduce the occurrence of frictional wear. The coating 22 may also be resilient so as to provide some form of damping by elastic deformation. Considering the proximity to the combustion chamber of the combustor 16, the coating 22 may be made of a material capable of sustaining the conditions of combustion. According to an embodiment, the coating 22 is integral with the first end 21A of the body 21 of the stand-off device 20. As another embodiment, the stand-off device 20 is made from a low friction rigid material. The coating 22 can be also applied on the stand-off device 20 only, or on the stand-off device 20 and CMC inner skin 30 as well. Also, the coating 22 or a pad with such coating properties may be embedded into the CMC part component.

Referring to FIG. 3, another embodiment of the stand-off device for maintaining a spacing in a double-skin combustor liner is generally shown at 20'. The stand-off device 20' has components in common with the stand-off device 20 of FIG. 2, whereby like elements will bear like reference numerals. Like the stand-off device 20, the stand-off device 20' may be used in the gas turbine engine 10 of FIG. 1, with one or both of the inner liner 16A and outer liner 16B. The stand-off device 20' is tasked with holding the skins 30 and 40 (a.k.a., combustor skins) spaced apart from one another for backside impingement and/or front-side effusion cooling, while allowing the thermal expansion of the skins 30 and 40 relative to one another.

The stand-off device 20' has a body 21. The body 21 has a first end 21A and a second end 21B. The body 21 may be made of ceramic matrix composite (CMC), or metal, etc. In an embodiment, the body 21 is a monoblock component. The length of the body 21 is such that the inner skin 30 is held spaced apart from the outer skin 40, such that the gap G is maintained between the skins 30 and 40. The first end 21A is in contact with the radially outer surface of the inner skin 30. The first end 21A may have different geometries, including generally flat, spherical, or annular, etc, to press against the inner skin 30. The body 21 is retained by the outer skin 40, and passes through an opening 40A in the outer skin 40 for the first end 21A to hold the inner skin 30 spaced apart from the outer skin 40. As observed from FIG. 3, the second end 21B of the body 21 is accessible from an outer surface of the outer combustor skin 40, i.e., the surface facing away from the combustor chamber inward of the inner skin 30.

In FIG. 3, the second end 21B has a head portion. A biasing assembly collaborates with the body 21 to bias same against the inner skin 30. According to an embodiment, the biasing assembly has a retaining member or support, secured to the outer skin 40, and a biasing component. As an example, the biasing assembly may include a cap 25, mounted to the outer skin 40, covering the second end 21B. The cap 25 may have a hat-like body, with an inner cavity, A biasing device 26 may be inside the inner cavity of the cap 25, to apply a biasing pressure on the head portion at the second end 21B of the stand-off device 20'. The biasing device 26 may be any appropriate type of spring (e.g., a coil spring), a rubber or like flexible bumper, a deformable member, a bushing. The biasing device 26 applies a pressure on the body 21 such that the body 21 presses against the inner skin 30. The cap 25 is one of many possible components that may be used as support and backing for the biasing device 26, with other components including a bracket, a stop, etc. The enlarged portion at the second end 21B, i.e., the head portion, forms a stop to block the body 21 from moving forward through the opening 40A when the body 21 reaches that point.

The stand-off devices 20' may be fixed at a discrete locations on the combustor 16. The stand-off devices 20' may be installed from the exterior of the combustor 16, i.e., from a point of view looking at the outer surface of the outer skin 40. This installation may require that the openings 40A already be present in the outer skin 40 and/or that the openings be machined before the installation of the stand-off devices 20. In an embodiment, the body 21 is first inserted into the opening 40A. The cap 25 and biasing device 26 are then added, with the biasing device 26 being loaded when the cap 25 is secured to the outer skin 40. The cap 25 may be installed in any appropriate way, including fastening, bonding, welding, gluing, etc.

Still referring to FIG. 3, the coating 22, for instance in the form of a build-up layer of silicon or like coating, may optionally be used at the interface between the first end 21A and the cold side of the inner skin 30. In the illustrated embodiment, the coating 22 may be a disc (e.g., a CMC disk, etc) enveloped in a low-friction material. The coating 22 may be resilient so as to provide some form of damping by elastic deformation. Considering the proximity to the combustion chamber of the combustor 16, the coating 22 may be made in a material capable of sustaining the conditions of combustion. According to an embodiment, the coating 22 is integral with the first end 21A of the body 21 of the stand-off device 20'.

The biasing device 26 provides damping to the combustor movement. The body 21, in its pin shape, by pushing the inner skin 30 away from the outer shell 40, maintains the air gap G for the backside impingement coolant to perform the cooling effect.

In the arrangement of the stand-off devices 20 and 20', the metallic components are substantially isolated from the combustion gases. As assembled, the stand-off devices 20 and 20' hold the inner skins 30 and the outer skins 40 spaced apart from one another with the annular space G between them. In an embodiment, the inner skins 30 are of CMC, and the outer skins 40 are of metal, whereby the thermal expansion may differ between the inner skins 30 and the outer skins 40 during combustion. This thermal expansion differential may have an axial component and/or a radial component to it. Stated differently, the inner skins 30 may expand in the axial direction differently than the outer skins 40 and/or the inner skins 30 may expand in the radial direction differently than the outer skins 40. Accordingly, the presence of the coating 22 and biasing device 26 (FIG. 3), and the capability for the first end 21A to move along the surface of the inner skin 30 (i.e., they are not rigidly connected to one another), allows such expansion differential while not substantially stressing the skins 30 and 40.

In an embodiment, a plurality of the stand-off devices 20 and/or 20' are circumferentially distributed around the combustor 16 at predetermined axial positions of the combustor 16. In having this plurality of stand-off devices 20 and/or 20', the CMC panels 30 are retained in proper spacing relative to the outer skins 40. The resulting proper spacing may contribute to the effective sealing effect between the inner skin 30 and components to which they are interfaced.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A combustor for a gas turbine engine comprising:
   a combustor chamber defined at least partially by an outer combustor skin being metallic and by an inner combustor skin made of a ceramic matrix composite (CMC), a coating against the inner combustor skin; and
   a plurality of stand-off devices, each standoff-device of the plurality of stand-off devices having a body including a first end and a second end, the second end of the body retained in an opening in the outer combustor skin, the first end spaced apart from the second end and abutting the coating disposed between the first end of the body and the inner combustor skin, to space the inner combustor skin apart from the outer combustor skin, the first end being displaceable relative to the inner combustor skin.

2. The combustor according to claim 1, wherein the body has enlarged portions on opposite sides of the opening.

3. The combustor according to claim 2, wherein the body has an elongated pin shape having a long axis coinciding with an axis of the opening in the outer combustor skin.

4. The combustor according to claim 1, wherein the stand-off devices are circumferentially and axially distributed along the combustor chamber.

5. The combustor according to claim 1, further comprising a biasing assembly biasing the body against the inner combustor skin.

6. The combustor according to claim 5, wherein the body has a stop portion at the second end to bound movement of the body when biased.

7. The combustor according to claim 5, wherein the biasing assembly includes a spring.

8. The combustor according to claim 7, wherein the biasing assembly includes a cap secured to an outer surface of the outer combustor skin and accommodating the spring therein.

9. The combustor according to claim 1, wherein the coating is secured to the inner combustor skin.

10. The combustor according to claim 1, wherein the coating is resilient and configured to provide damping by elastic deformation of the coating.

11. A combination comprising a stand-off device and a double-skin combustor liner having an outer combustor skin and an inner combustor skin, the stand-off device comprising a body having a first end and a second end, the body configured to be retained by the outer combustor skin and to pass through an opening in the outer combustor skin for the first end to hold the inner combustor skin spaced apart from the outer combustor skin, the first end configured to contact a coating applied against the inner combustor skin, the first end being displaceable relative to the inner combustor skin, the second end of the body accessible from an outer surface of the outer combustor skin.

12. The combination according to claim 11, wherein the body has enlarged portions configured to be on opposite sides of the opening.

13. The combination according to claim 12, wherein the body is a rivet.

14. The combination according to claim 11, wherein the first end has a flat contact surface configured to contact the inner combustor skin.

15. The combination according to claim 11, further comprising a biasing assembly configured to bias the body against the inner combustor skin.

16. The combination according to claim 15, wherein the body has a stop portion at the second end to bound movement of the body when biased.

17. The combination according to claim 15, wherein the biasing assembly includes a spring.

18. The combination according to claim 17, wherein the biasing assembly includes a cap configured to be secured to the outer surface of the outer combustor skin and accommodating the spring therein.

19. A combustor for a gas turbine engine, comprising:
   a combustor chamber defined at least by an outer combustor skin being metallic and by an inner combustor skin made of a ceramic matrix composite (CMC); and
   a plurality of stand-off devices, each standoff-device of the plurality of stand-off devices having a body including a first end and a second end, the second end of the body retained in an opening in the outer combustor skin, the first end spaced apart from the second end and abutting the inner combustor skin to space inner combustor skin apart from the outer combustor skin, the first end being displaceable relative to the inner combustor skin, the body having an outer portion abutted against an outer surface of the outer combustor skin and an inner portion abutted against an inner surface of the outer combustor skin, the outer portion having an outer portion diameter and the inner portion having an inner portion diameter, the outer portion diameter and the inner portion diameter being greater than a diameter of the opening in the outer combustor skin.

20. The combustor according to claim 19, comprising a coating against the inner combustor skin, the coating disposed between the first end of the body and the inner combustor skin.

\* \* \* \* \*